United States Patent Office 3,172,863
Patented Mar. 9, 1965

3,172,863
REGENERATION OF SPENT NICKEL CATALYST
Jesse M. Brooke, Sweeny, Tex., assignor to Phillips Petroleum Company, a corporation of Delaware
No Drawing. Filed Aug. 28, 1961, Ser. No. 134,140
9 Claims. (Cl. 252—415)

This invention relates to a process for regenerating a spent nickel-containing catalyst.

Nickel distended or supported of kieselguhr (diatomaceous earth) silica gel, or other silica-containing support is frequently utilized in the hydrogenation of hydrocarbons. Benzene is being hydrogenated to cyclohexane with such a catalyst in a commercial plant. The catalyst initially consists of 57 percent kieselguhr and 43 percent nickel (by weight). Because of the presence of sulfur compounds such as $H_2S$ and mercaptans in the hydrocarbon feed, a portion of the nickel in the catalyst is converted to nickel sulfide which is detrimental to the action of the catalyst in the hydrogenation process. The more nickel sulfide in the catalyst, the less active the catalyst for hydrogenation. Some of the nickel in the catalyst may be in the form of nickel oxide. It is conventional practice to regenerate this type of catalyst by contacting it with hydrogen at high temperatures; but it is impossible to reduce all of the nickel sulfide to nickel by this method without utilizing contact temperatures which are highly detrimental to the composite catalyst. The high temperatures required for substantially complete reduction of nickel sulfide with hydrogen have the effect of reducing the surface area of the catalyst base or support, thereby decreasing the hydrogenation activity of the catalyst.

This invention is concerned with a novel process for regenerating a supported nickel catalyst which has become contaminated with nickel sulfide by contacting the catalyst with a sulfur-containing hydrocarbon feed.

Accordingly, it is an object of the invention to provide an improved and novel process for regenerating a spent supported nickel catalyst containing nickel sulfide. Another object is to provide a regeneration process applicable to a supported nickel and nickel sulfide-containing catalyst which reduces the amount of nickel sulfide below the level obtained by reduction with hydrogen at comparable temperatures. Other objects of the invention will become apparent to one skilled in the art upon consideration of the accompanying disclosure.

A broad aspect of the invention comprises regenerating a nickel and nickel sulfide-containing supported catalyst by the steps of (a) converting the nickel sulfide to either nickel chloride or nickel bromide, (b) oxidizing the resulting nickel halide to nickel oxide, and (c) reducing the nickel oxide to nickel. The preferred method involves contacting the spent catalyst with the halogen ($Cl_2$ or $Br_2$) at a temperature in the range of about 500 to 950° F. to produce the nickel halide desired, thereafter contacting the nickel halide-containing catalyst with an oxygen-containing gas at a temperature in the range of 500 to 950° F. so as to convert the nickel halide to nickel oxide, and thereafter contacting the nickel oxide-containing catalyst with hydrogen at reducing temperatures such as about 500 to 950° F. Operation at temperatures not exceeding about 750° F. in all three steps is preferred so as to extend the life of the catalyst.

The contacting of the catalyst with various treating gases may be effected in any desirable manner and until the desired amount of conversion has been produced. It is conventional to utilize the nickel-kieselguhr catalyst in a fixed bed process wherein the feed is passed thru one or more beds in a reactor. When regenerating the catalyst the feed is cut off and the hot treating gas is passed thru the bed either in the same direction as the feed or in the opposite direction until the desired conversion of the catalyst is produced. It is desirable to purge the reactor or catalyst bed with an inert gas, such as nitrogen, after each contacting step and, particularly, after the oxygen contacting step before passing hydrogen thru the reactor and catalyst bed. Likewise, it is preferred to purge after the halogen treatment so as to purge the catalyst of sulfural halide and halogen. Before the first contacting step (with halogen) it is advantageous to steam strip the volatiles from the catalyst, although this procedure is not absolutely necessary.

The three step process for the conversion of nickel sulfide to nickel is illustrated below:

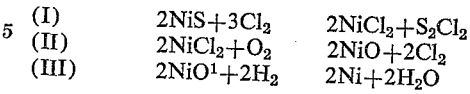

[1] The NiO produced by the above and any NiO present before oxidation are reduced to nickel.

In a conventional process wherein hydrogenation is effected (e.g., benzene is hydrogenated to cyclohexane) using a hydrogen-containing gas and a nickel catalyst (e.g., nickel on kieselguhr), and wherein the catalyst is occasionally regenerated by first treating with oxygen and then with a hydrogen-containing stream, there is left on the catalyst a considerable quantity of nickel salts (e.g. nickel sulfide and nickel sulfate) which are not active as hydrogenation catalyst, and the prior art catalyst regeneration does not restore the catalyst to its available nickel content.

Using the three-step regeneration process of the invention, wherein the catalyst is first treated with a chlorine-containing stream, then with an oxygen-containing stream, and finally with a hydrogen-containing stream, a greater conversion of sulfur-containing nickel compounds is effected than by regenerating with hydrogen alone at comparable temperatures.

Typical used catalyst composition is as follows:

| | Wt. percent |
|---|---|
| Kieselguhr | 57 |
| Nickel sulfide (measured as nickel) | 43 |

Conventional oxidation of the above used catalyst followed by treatment with hydrogen-containing gas to reduce same gives a typical regenerated catalyst composition:

| | Wt. percent |
|---|---|
| Kieselguhr | 57 |
| Nickel | 38 |
| Nickel sulfide (measured as nickel) | 2 |
| Nickel sulfate (measured as nickel) | 3 |

Regeneration of the above used catalyst in accordance with the invention gives a typical regenerated catalyst composition:

| | Wt. percent |
|---|---|
| Kieselguhr | 57 |
| Nickel | 41 |
| Nickel sulfide (measured as nickel) | 1 |
| Nickel sulfate (measured as nickel) | 1 |

It can be seen that the process of the invention produces more nickel catalyst upon regeneration than does the prior art practice (41 weight percent as compared to 38 weight percent).

The temperature of the chlorine treatment is about 650° F. but may range from 500 to 950° F. The chlorine-containing gas is added at the rate, including recycled effluent gas, of one-half pound of chlorine per pound of catalyst per hour. Usually about two hours of contact time with chlorine is sufficient to convert the nickel sulfide to nickel chloride. The pressure used is not critical but can very from atmospheric to several hundred p.s.i. After chlorine treatment a nitrogen purge is employed to help strip out the residual $S_2Cl_2$ produced during the chlorination step.

In the second step of the process oxygen-containing gas (air) is passed thru the catalyst bed to effect production of nickel oxide from the nickel chloride produced in the preceding step. A small portion of nickel sulfide remains after the chlorine treatment and a portion of this nickel sulfide is converted to nickel sulfate in the second or oxidizing step. The preferred oxidizing temperature is about 700° but can range from 550 to 950° F. The pressure is the same as in the preceding step. About 20 standard cubic feet of air per pound of catalyst per hour is used. About four hours time is usually sufficient for oxidizing the nickel chloride. Nitrogen purge is used after the oxidation step.

Finally the nickel oxide resulting from the oxidation step is reduced to active nickel catalyst by the hydrogen-containing gas (may contain methane diluent). The preferred temperature is about 700° F. but may range from 500 to 950° F. The pressure may be the same as in the preceding steps. About 30 standard cubic feet of hydrogen per pound of catalyst per hour is used and 4 to 8 hours operation is usually sufficient to effect the desired reduction.

It is preferred to operate below about 750° F. in all three steps of the process so as to not heat-damage the catalyst, and to use several hundred pounds of pressure to decrease the volume of treating fluids to be circulated.

In the preceding disclosure where the chloride and chlorine are referred to, it is to be assumed that the same remarks are applicable to the bromide and bromine.

Certain modifications of the invention will become apparent to those skilled in the art and the illustrative details disclosed are not to be construed as imposing unnecessary limitations on the invention.

I claim:

1. A process for regenerating a supported spent nickel-containing catalyst in which a substantial portion of the nickel is in the form of nickel sulfide which comprises contacting said catalyst with a halogen selected from the group consisting of chlorine and bromine at a temperature in the range of 500 to 950° F. so as to convert said nickel sulfide to nickel halide; thereafter contacting the resulting halogenated composite with $O_2$ at a temperature in the range of 500 to 950° F. so as to convert said nickel halide to nickel oxide; and thereafter reducing the resulting oxidized composite with hydrogen so as to produce an active nickel catalyst.

2. The process of claim 1 wherein said support comprises essentially silica.

3. The process of claim 1 wherein said support is kieselguhr.

4. The process of claim 1 including the steps of purging said catalyst with an inert gas after the first and second contacting steps.

5. The process of claim 1 wherein said halogen is chlorine.

6. The process of claim 1 wherein said halogen is bromine.

7. A process for regenerating a supported spent nickel-containing catalyst in which a substantial portion of the nickel is in the form of nickel sulfide which comprises converting said nickel sulfide to a nickel halide selected from the group consisting of nickel chloride and nickel bromide by reaction with the corresponding halogen; thereafter oxidizing said nickel halide to nickel oxide by reaction with a free oxygen-containing gas; and thereafter reducing said nickel oxide to elemental nickel by reaction with hydrogen.

8. The process of claim 7 wherein said nickel is supported on silica and said nickel sulfide is converted to nickel chloride.

9. The process of claim 7 wherein said nickel is supported on silica and said nickel sulfide is converted to nickel bromide.

References Cited in the file of this patent

UNITED STATES PATENTS

| | | |
|---|---|---|
| 2,267,736 | Ipatieff et al. | Dec. 30, 1941 |
| 2,273,864 | Houdry | Feb. 24, 1942 |